(12) United States Patent
Everard

(10) Patent No.: US 9,267,525 B2
(45) Date of Patent: Feb. 23, 2016

(54) VERIFICATION ARRANGEMENT FOR FASTENER SYSTEM

(75) Inventor: Stephen M. Everard, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 277 days.

(21) Appl. No.: 14/006,759

(22) PCT Filed: Mar. 23, 2012

(86) PCT No.: PCT/US2012/030263
§ 371 (c)(1),
(2), (4) Date: Sep. 23, 2013

(87) PCT Pub. No.: WO2012/129471
PCT Pub. Date: Sep. 27, 2012

(65) Prior Publication Data
US 2014/0017036 A1 Jan. 16, 2014

Related U.S. Application Data

(60) Provisional application No. 61/467,099, filed on Mar. 24, 2011.

(51) Int. Cl.
*F16B 21/00* (2006.01)
*F16B 21/02* (2006.01)
(Continued)

(52) U.S. Cl.
CPC .............. *F16B 21/02* (2013.01); *B60R 21/213* (2013.01); *F16B 1/0071* (2013.01)

(58) Field of Classification Search
CPC .......... F16B 1/0071; F16B 5/10; F16B 21/00; F16B 21/02; F16B 2005/0671; B60R 21/20; B60R 21/213

USPC ............. 411/349, 500, 549, 553, 508; 24/568
See application file for complete search history.

(56) References Cited

U.S. PATENT DOCUMENTS 1,803,431 A * 5/1931 Thomas ........................ 411/349
2,262,418 A * 11/1941 Zahodiakin ................... 411/349
(Continued)

FOREIGN PATENT DOCUMENTS

DE            29812889 U1    10/1998
DE        102004025698      12/2005
(Continued)

OTHER PUBLICATIONS

Corresponding International Application No. PCT/2012/030263 Search Report Sep. 9, 2010.

*Primary Examiner* — Roberta Delisle

(57) ABSTRACT

A quarter turn fastener employed to affix a component to a structural base plate includes bar code indicia to verify installation and locking of the fastener. The fastener is positionable in an insertion position relative to the base plate for insertion through a receptacle, and rotatable one quarter turn to releasably secure it, and the component to the base plate. It includes resilient arms to urge an attachment portion of the fastener against the rear surface of the base plate which are configured to obscure at least a portion of the bar code indicia in any position other than the locked position. When rotated to the locked position, the attachment portion is urged against the rear surface of the base plate the resilient arms do not obscure the bar code indicia. Anti-rotation lugs releasably engage the receptacle to releasably latch the fastener in the locked position.

20 Claims, 5 Drawing Sheets

(51) Int. Cl.
*F16B 1/00* (2006.01)
*B60R 21/213* (2011.01)

(56) References Cited

U.S. PATENT DOCUMENTS

| | | | | |
|---|---|---|---|---|
| 4,262,394 | A * | 4/1981 | Wright | 411/548 |
| 5,368,427 | A * | 11/1994 | Pfaffinger | 411/553 |
| 5,765,959 | A * | 6/1998 | Shioda | 403/199 |
| 6,267,543 | B1 | 7/2001 | David et al. | |
| 6,612,795 | B2 * | 9/2003 | Kirchen | 411/508 |
| 6,769,853 | B2 * | 8/2004 | Perrot | 411/553 |
| 6,988,863 | B2 * | 1/2006 | Hulin et al. | 411/553 |
| 7,677,598 | B1 * | 3/2010 | Ryan et al. | 280/730.2 |
| 8,474,111 | B2 | 7/2013 | Ribes | |
| 9,062,696 | B2 | 6/2015 | Demerath et al. | |
| 2006/0285918 | A1 * | 12/2006 | Legat et al. | 403/397 |
| 2012/0192388 | A1 | 8/2012 | Demerath et al. | |

FOREIGN PATENT DOCUMENTS

| | | |
|---|---|---|
| DE | 102006052836 | 8/2008 |
| DE | 102011009683 | 8/2012 |
| EP | 1220592 A1 | 7/2002 |
| WO | 0169726 A1 | 9/2001 |
| WO | 2010012422 A1 | 2/2010 |
| WO | 2010117322 A1 | 10/2010 |

* cited by examiner

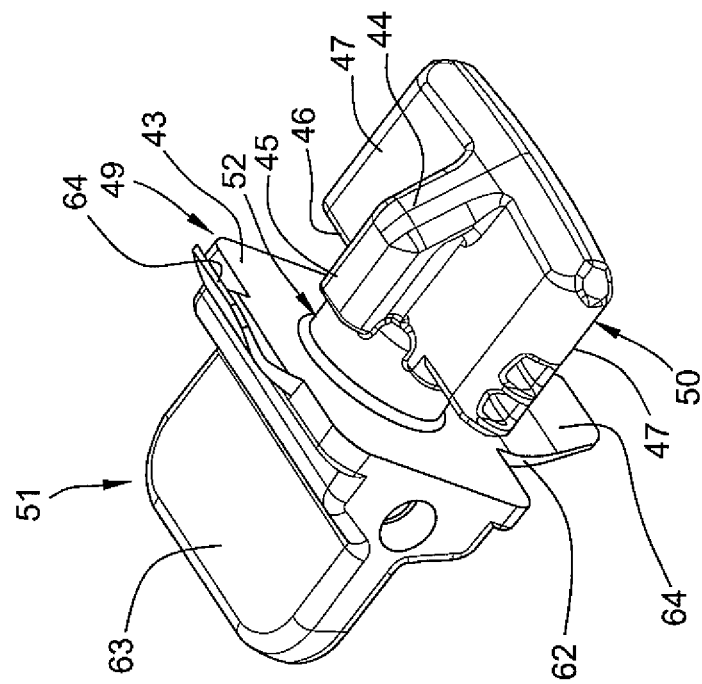
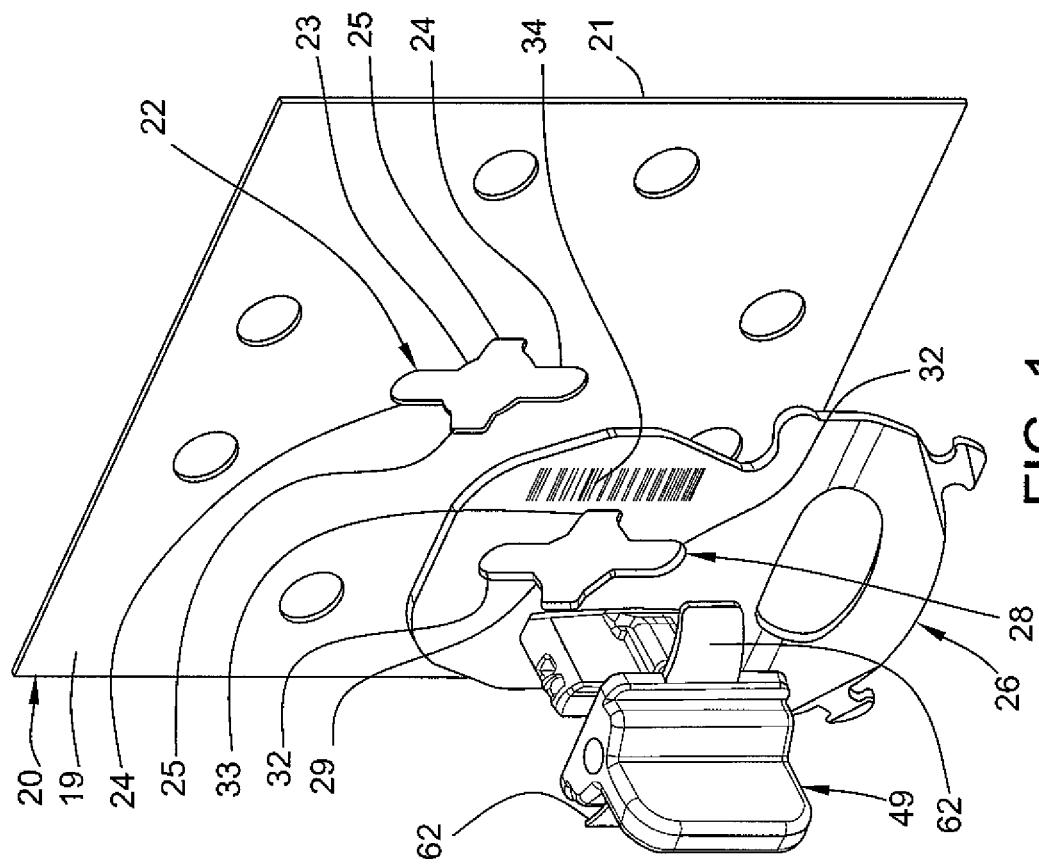

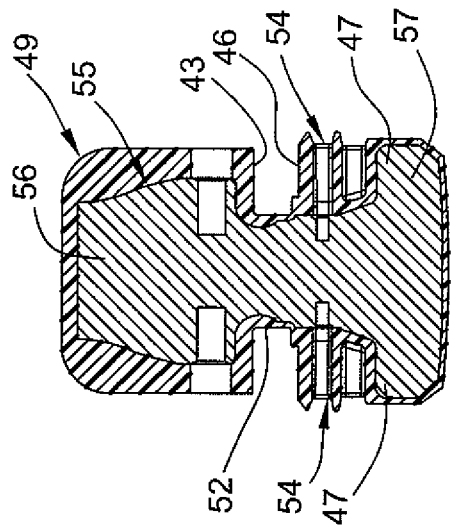
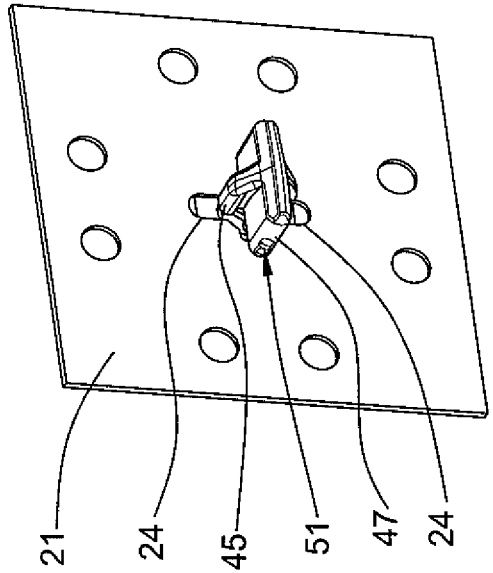
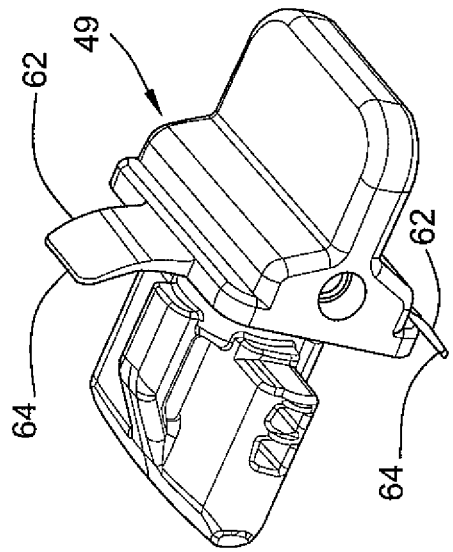
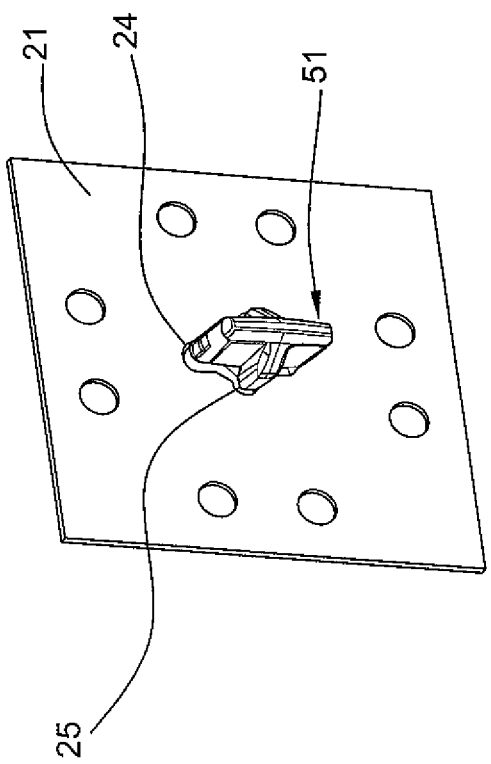

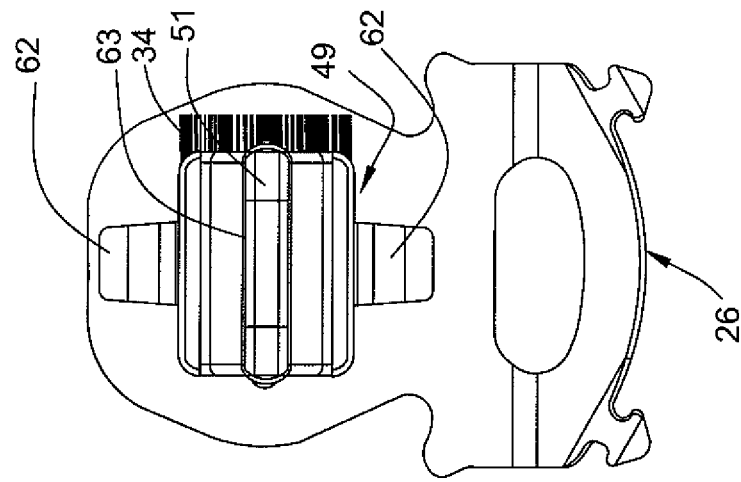
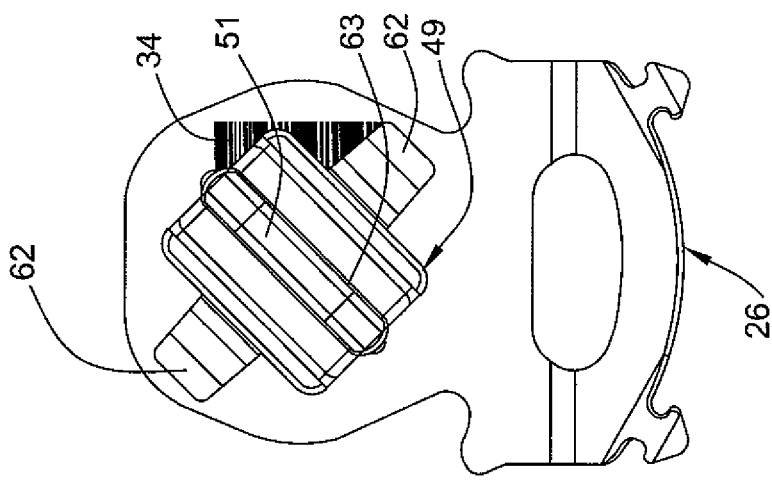
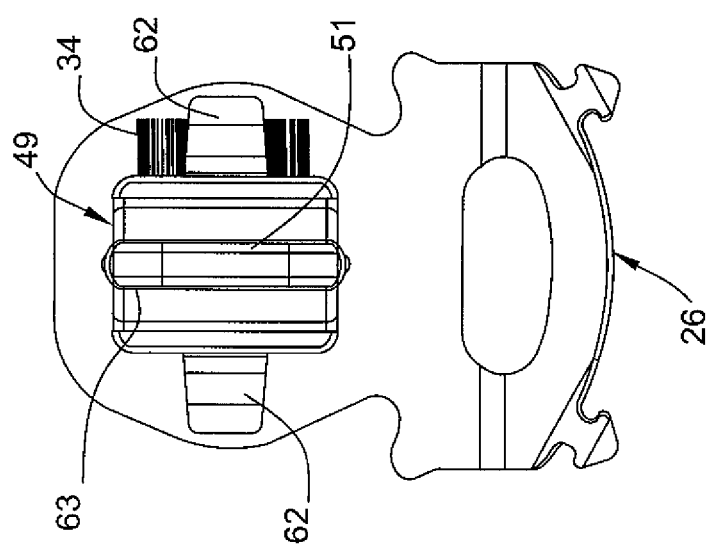

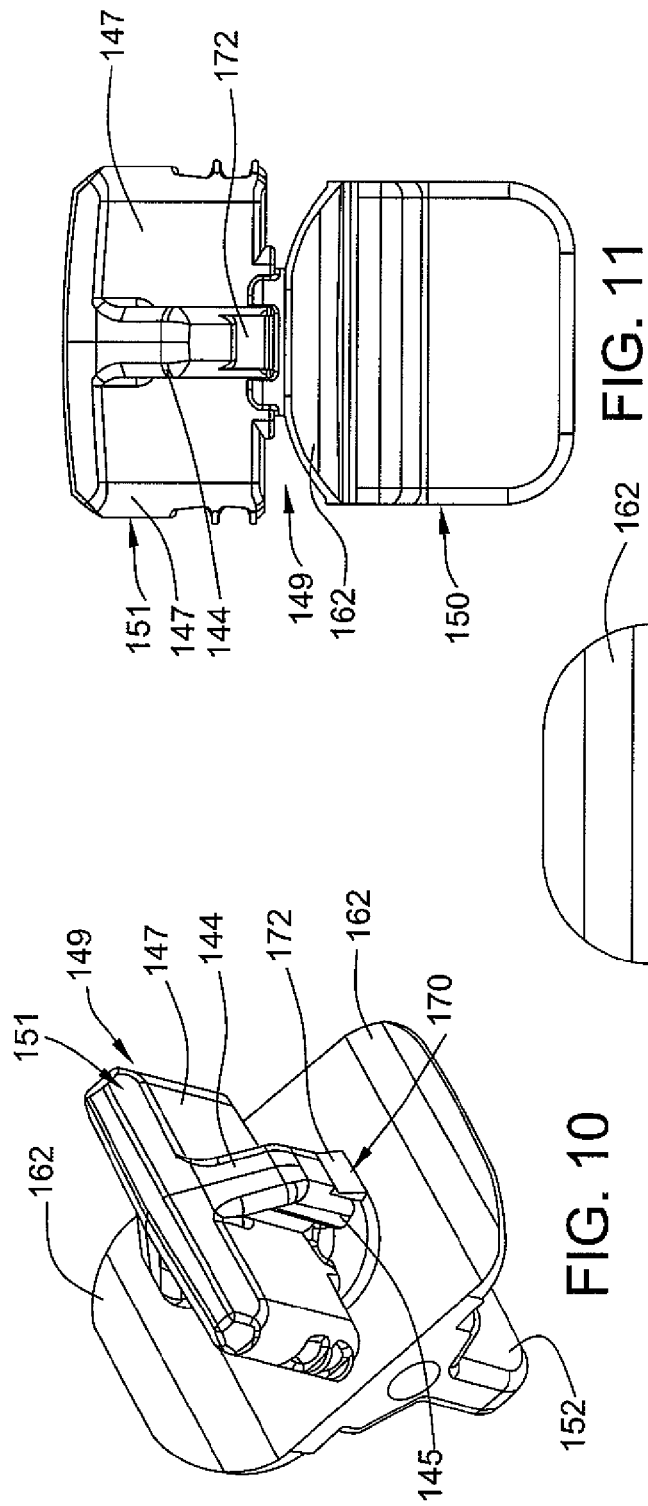
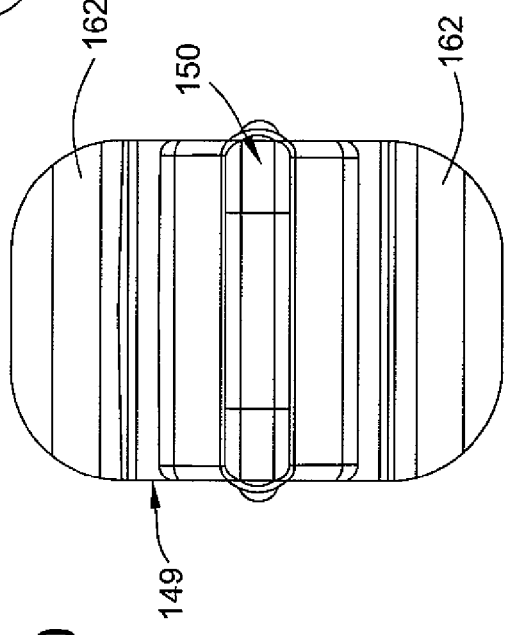
FIG. 11
FIG. 12
FIG. 10

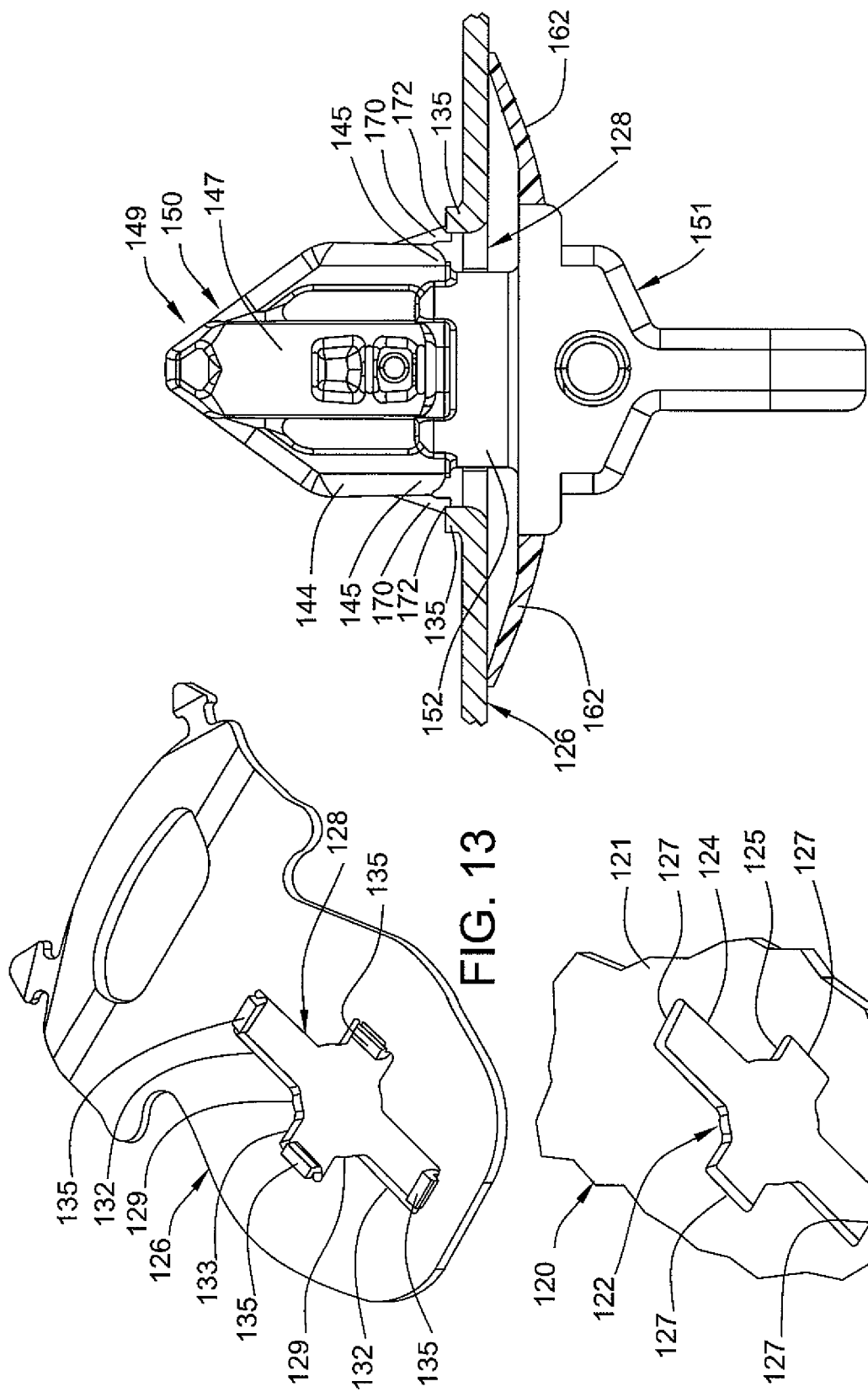

VERIFICATION ARRANGEMENT FOR FASTENER SYSTEM

RELATED APPLICATIONS

The present application is based on, and claims priority from International Application Number PCT/US2012/030263, filed Mar. 23, 2012 and U.S. Provisional Application Number 61/467,099, filed Mar. 24 2011, the disclosure of which is hereby incorporated by reference herein in its entirety.

CROSS-REFERENCE TO RELATED APPLICATION

This application claims priority pursuant to Title 35 USC Sec. 119 to U.S. Provisional Application No. 61/467,099, filed Mar. 24, 2010, for "Verification Arrangement for fastener System," the entire contents of which are hereby incorporated by reference herein as if fully set forth.

BACKGROUND

This disclosure is directed to rotatable fasteners to connect an attachable component to a base or anchor. More particularly, it is directed to an arrangement for verification of a completed connection between the fastener and the base.

In the assembly of various structures, for example automotive vehicles, rotatable fasteners commonly referred to as "quarter turn" fasteners are often employed to attach equipment to the vehicle body. One such use involves attachment of side curtain airbags to the roof rail of the vehicle. Such fasteners advantageously attach to a base plate or anchor previously secured to the roof rail. Such fasteners may also include an energy absorption mechanism which, on inflation of the curtain airbag, absorbs energy of inflation to reduce the resultant force application to the vehicle structure. Such a fastener is known, and is disclosed in International Publication WO 2010/117322, published Oct. 14, 2010, and entitled "Fastener for Air Bag Curtain."

In the assembly of consumer products such as automotive vehicles, manufacturers take precautions to ensure ultimate quality and reliability of the product. Quality assurance involves review and inspection of processes involved in assembly to verify the accomplishment of specific tasks, such as correct and complete connection and fixation of attached elements. Quality control is an important aspect of the securement of fasteners such as described for affixation of the curtain airbag within an automotive vehicle.

Commonly, electronic recognition equipment is employed to monitor the assembly process. Often such electronic sensing is associated with a central processing unit (computer) which, in response to a recognized anomaly, provides output signals to trigger an alarm or other signal, or control an action.

One effective approach to verification is to provide bar code numerization of components to be secured and program the computer to generate an output signal in response to the results of the comparison of input data received from verification sensing to information stored in the computer readable medium.

The present disclosure applies the bar code recognition function available at the original equipment manufacturer (OEM) to ensure complete and proper affixation of the fasteners to the base anchors. Toward that end, the fastener is configured to block scannable access to the bar code indicia unless affixation to the vehicle roof rail is correct and complete.

DESCRIPTION OF THE DRAWINGS

FIG. 1 is an exploded perspective view of the elements involved in attachment of a component to a base plate, including the quarter-turn fastener embodying the features of the present disclosure;

FIG. 2 is a rear perspective view of a fastener embodying the features of the present disclosure;

FIG. 3 is a front perspective view of the fastener of FIG. 1;

FIG. 4 is a cross-sectional plan view of the fastener of FIG. 1;

FIG. 5 is a rear perspective view of the anchor or base of a vehicle being assembled and the fastener of FIG. 1 in its initial insertion position for attachment to the base plate or anchor on the vehicle;

FIG. 6 is a rear perspective view of the anchor or base shown in FIG. 5 with the quarter-turn fastener of FIG. 1 rotated to its attached and locked position;

FIG. 7 is a plan view of the quarter turn fastener and curtain airbag hanger of the verification system of the present disclosure with the quarter turn fastener in its initial insertion position;

FIG. 8 is a plan view of the quarter turn fastener and curtain airbag hanger of the verification system of the present disclosure with the fastener in a partially rotated position;

FIG. 9 is a plan view of the quarter turn fastener and curtain airbag hanger of the verification system of the present disclosure with the fastener in its locked position;

FIG. 10 is a rear perspective view of a modified form of the quarter turn fastener of the embodiment of FIGS. 1 to 9;

FIG. 11 is a top view of the quarter turn fastener of FIG. 10;

FIG. 12 is a front view of the quarter turn fastener of FIG. 10;

FIG. 13 is a perspective view of a modified form of the hanger bracket of the disclosure;

FIG. 14 is a perspective view of a modified form of base plate;

FIG. 15 is a top view, partially in section of the fastener of FIG. 10 pre-assembled with the hanger bracket of FIG. 13.

DETAILED DESCRIPTION

The quarter turn fastener of the present disclosure is particularly suitable for affixing a side airbag curtain to the frame of an automotive vehicle. Though illustrated here in that context, it is considered useful in numerous other applications where a releasable connection is desired. The quarter turn fastener of this disclosure is particularly advantageous in that it includes mechanism to provide verification of complete affixation to the base.

Known vehicle curtain airbag assemblies usually include a plurality of spaced hanger brackets designated 26 and best seen in FIG. 1, usually a steel stamping, for attachment to the vehicle body. As illustrated here, each hanger bracket 26 includes a vertically elongated fastener receiving hole 28, having a central generally circular opening 29 and opposed long slots 32 and opposed short slots 33 with distal curved ends. It is of general cruciform shape with the long slots and short slots positioned at right angles to each other. The shape of the fastener receiving hole 28 is dictated by the shape of a portion of the quarter turn fastener as will become apparent.

In accordance with the system of the disclosure, each hanger bracket 26 is provided with a scannable or machine readable medium or indicia which, when recognized by the scanning equipment, confirms its proper securement to the vehicle by a properly inserted and locked fastener. The present disclosure, however, is suitable for use in any application employing a quarter turn fastener of the type disclosed without regard to the component being attached.

As illustrated, each hanger bracket 26 is provided with a vertically disposed bar code indicia 34. It may be a printed label held in place by adhesive, or laser formed, directly on hanger bracket 26. The bar code indicia are pre-arranged to provide desired information to the verification system employing a bar code scanner, a computing device including a central processing unit, a computer readable medium, data and associated software. For example, the indicia may represent a numeric sequence. The software would be configured to recognize the numerical sequence for each vehicle to ensure all hangers are in place and assembly complete.

Indicia 34 is a conventional bar code presentation. It includes a series of printed parallel lines having different widths. The line pattern represents a particular numerical sequence unique to the article to which it is attached. It is expected that in any given installation of curtain airbags in a vehicle ten or more fasteners are used (five per curtain).

Each hanger bracket 26 may be provided with a bar code unique to it. These bar code indicia may be read by electronic readers or scanners utilized during the assembly process. The information read by the bar code reader equipment may then be supplied to a computing device. The computing device may be provided with data stored in a machine readable medium for comparison with the results of the scanned data to verify the presence of each hanger. In this disclosure, the relationship between the fastener and the bar code is such that recognition of the bar code also evidences completion of the securement and latching of the fasteners connecting the curtain airbags to the vehicle.

FIGS. 1, 5 and 6 show an anchor, or base plate 20, usually a steel stamping, normally attached to a roof rail of a vehicle being assembled at an OEM assembly facility. Base plate 20 is a part of the vehicle being assembled. It has a forward or outward surface 19 seen in FIG. 1 facing away from the structure to which it is attached and a rear or rearward surface 21 seen in FIGS. 5 and 6 facing toward the structure when secured to the vehicle roof rail by welding or the like.

Several spaced base plates 20 are provided in appropriate locations, as required. It is a metal plate of sufficient strength to support loads expected from the fastened article, in this instance a curtain airbag assembly.

As illustrated in detail in FIGS. 1, 4 and 5, base plate 20 includes a vertically elongated fastener receptacle 22 to receive and pass a portion of the quarter turn fastener as discussed below. Each base plate 20 is positioned such that sufficient void space exists behind the receptacle 22 to permit attachment of a fastener 49 to the base plate 20.

Best seen in FIG. 1, the receptacle 22 is a cruciform shape. As illustrated, it includes a generally circular opening 23 and opposed long slots 24 on the vertical long axis and opposed short slots 25 on its horizontal axis. The slots have distal curved ends complementary to the shape of the slots 32 and 33 in hanger bracket 26. The receptacle 22 permits passage of a portion of the fastener through the receptacle for disposition behind the plate 20.

It should be understood that throughout this specification reference to "horizontal" and "vertical" is for clarity of description of the illustrations and not limitation. That is, fastener component portions, bar code positions and orientation of the slots in the hanger bracket 26 or base plate 20 are relative to each other. The slots could be oriented in any angular disposition relative to a longitudinal or vertical plane and the fastener configured and positioned accordingly.

Moreover, though the opposed long slots 32 of hanger bracket 26 and long slots 24 of base plate 20 are shown as located on a generally vertical plane this is not a critical relationship. The slot portions of each component could be disposed at some other suitable angle to each other and the fastener configured to accommodate such a configuration.

The quarter turn fastener for the verification system of the present disclosure, is illustrated in FIGS. 1 to 9. The fastener, generally designated 49 is configured to attach a component, such as hanger bracket 26, to an anchor or a base plate 20 by insertion into preformed receptacle 22 and rotation of the fastener ninety degrees (90°) to a locked position. The illustrated component is a curtain airbag hanger bracket 26 as seen in FIGS. 1, and 7 to 9 attachable to vehicle anchor or base plate 20. The vehicle is provided with a plurality of base plate components 20 pre-positioned and secured to the vehicle roof rail generally above a side window.

Referring to the drawings, illustrated fastener 49 is representative of a quarter turn fastener employed to affix a curtain airbag assembly to a roof rail of a vehicle. It is configured to permit scanning of bar code indicia 34 only if properly secured to the base plate 20 of the vehicle.

The fastener 49, shown in FIG. 1, includes a body having a rear attachment portion 50 and a forward head portion 51, which are spaced apart and joined by a central cylindrical shaft portion 52. Central cylindrical shaft portion 52 is sized to receive hanger bracket 26 at hole 28 and support the hanger bracket on central generally cylindrical shaft portion 52 of the fastener 49.

The attachment portion 50 is cruciform shaped and includes two radial opposed long bars 47 illustrated on a vertical axis in FIGS. 1 and 5. They define planar abutment surfaces 46 arranged to contact rear surface 21 of base plate 20 when fastener 49 is in the locked position. The fastener is arranged such that long bars 47 of attachment portion 50 may be inserted through opposed long slots 32 of fastener receiving hole 28 of hanger bracket 26. Similarly, attachment portion 50 is configured for insertion through long slots 24 of mounting receptacle 22 in base plate 20. The fastener 49 is rotated 90 degrees (90°) to complete its attachment to plate 20 with abutment surfaces 46 abutting rear surface 21 of base plate 20.

Attachment portion 50 also includes two opposed short bars 44 which define anti-rotation lugs 45 extending toward head portion 51. The outer edges of bars 44 and 47 are curved to freely pass the ends of the slots in hanger bracket 26 and base plate 20. During insertion of the attachment portion 50 through the hanger bracket 26 and base plate 20, the short bars 44 pass respectively through short slots 33 of hanger bracket 26 and short slots 25 of base plate 20.

The anti-rotation lugs 45 are configured to engage within long slots 24 of mounting receptacle 22 of base plate 20 when fastener 49 is in the locked position to latch the fastener in its locked position and prohibit rotation of the fastener relative to the base plate 20. Rearward axial translation of the fastener 49 disengages the anti-rotation lugs 45 from long slots 24 and the fastener is freely rotated to its unlocked position with the long bars 46 aligned with long slots 24 and short bars 44 aligned with short slots 24.

The head portion 51 is of an elongate shape to provide a manual manipulation grip portion 63 for rotation and axial translation of the fastener 49. In the illustrated configuration, the elongate grip portion 63 is aligned with the extent of opposed long bars 47 of attachment portion 50 and perpendicular to the extent of opposed short bars 44. This relationship could, of course, be modified and the relationships with the hanger bracket and base plate realigned accordingly.

The fastener structure contemplated for the verification system of the present disclosure includes structural elements shown in the above-mentioned International Patent Publication WO 2010/117322. The fastener generally designated 49 in the accompanying drawings comprises a unitized body having a load bearing portion of sufficient structural integrity to maintain its shape on activation of the airbag deployment mechanism and a secondary energy absorbing portion adapted to deform on air bag actuation to absorb part of the energy associated with deployment. The fastener 49 minimizes stress and possible damage to the supporting frame of the vehicle. It also reduces the potential for detachment of the airbag safety device during deployment.

The head portion 51 is sized and shaped to assure a reliable connection to an airbag hanger bracket 26 and base plate 20. The attachment portion 50 is connected to the head portion 51 by interconnecting cylindrical shaft portion 52. Shaft portion 52 has an axial extent between head portion 51 and attachment portion 50 to accept the thickness of a curtain airbag hanger bracket 26 and base plate 20. The spacing is also sufficient to allow axial translation of the attachment portion 50 completely through base plate 20 and position the anti-rotation lugs 45 completely behind rear surface 21 of the base plate to permit rotation of fastener 49.

Shown in the cross sectional view in FIG. 4, the basic structure of the fastener 49 includes load bearing structure comprising a two headed interconnecting structural core 55. Core 55 includes enlarged end 56 defining head portion 51 sufficiently large to retain the bracket component of the fastener, and a second, enlarged end 57 defining attachment portion 50 preventing the fastener 49 from being detached from base plate 20 by being pulled through mounting receptacle 22 when the airbag curtain is activated. A central portion of core 55 defines the central cylindrical portion 52 of fastener 49.

Head portion 51 serves the purposes of providing a manual grasp element for rotation of fastener 49, and as a blocking element preventing the fastener 49 from being inserted completely into and through fastener receiving hole 28 or receptacle 22. Interconnecting portion 52 serves as an attachment point for the curtain airbag hanger 26.

The long bars 47 of the attachment portion 50 comprise energy absorbing structure 54. The energy absorbing structure 54 is shaped as a shell or cover surrounding the core 55. The core 55 may be made, for example, of die cast zinc. The energy absorbing structure may be plastic, such as polycarbonate/acrylonitrile butadiene styrene (PC/ABS).

The energy absorbing structure may be made of materials having a different (lower) modulus of elasticity than the load bearing structure. In this case, the general idea is to use a solid piece of material as the energy absorbing structure which is deformed while absorbing energy when subjected to strong forces. However, the energy absorbing structure may also be made as a frame work structure adapted to collapse when subjected to strong forces. In this case the material for the energy absorbing structure may have a considerably higher modulus of elasticity and the load bearing structure and energy absorbing structure may be made of the same material.

The shape of the energy absorbing structure may of course be different. However, as a general rule, the main part of the energy absorbing structure 54 is a part of the attachment portion 50 of the fastener 49 since the main purpose of the energy absorbing structure is to absorb energy while deforming when the fastener 49 is moving outwards, and it is thus the part of the energy absorbing structure in the attachment portion 50 which will absorb energy during this movement of the fastener.

The benefit of the fastener 49 is that substantial energy absorbing structure 54 may be located between the plate 20 at the receptacle 22 and the attachment portion 50. When the forces work on the fastener during deployment of the curtain airbag, the energy absorbing structure 54 will be deformed or collapsed during a movement of core 55 outward of the receptacle 22 and the energy absorbing structure will thus absorb energy such that there will be less damage on the receptacle 22 and less risk of detachment of the fastener 49.

Seen in FIGS. 1 and 3, arcuate radial arms 62 extend laterally from head portion 51 generally perpendicularly to the extent of head portion 51 and aligned with opposed short bars 44 of attachment portion 51. Each includes a laterally outer end 64 that is arranged to urge against the front surface of hanger bracket 26. The arms 62 extend from head portion 51 and are curved forwardly toward attachment portion 51 so that the ends 64 are forward of forward surface 43 of head portion 51 at its connection to central shaft portion 52. Arms 62 act as cantilever leaf springs and urge fastener 49 outward of receptacle 22 in base plate 20. This pulls planar surfaces 46 against the rear surface 21 of base plate 20 to secure the fastener 49 in base plate 20.

The spring-like characteristics of arms 62 result from the resilient nature of the arms 62 and the spacing of the ends 64 relative to rear planar surfaces 46 of long bars 47 of attachment portion 50. On insertion of the attachment portion 51 through fastener receiving hole 28, the ends 64 of arms 62 contact the forward surface of hanger bracket 26 before the anti-rotation lugs 45 clear the receptacle 22. It is necessary to deform the arms 62 to urge the planar surfaces 46 of long bars 47 of attachment portion 51 completely behind the rear surface 21 of base plate 20. This deformation creates a restoring force in the arms 62 which urges the fastener in a direction outward of the fastener receiving hole 28 in the direction opposite insertion. Of course, after the attachment portion completely clears the rear surface 21 of base plate 20 the fastener is rotated to place the planar surfaces 46 of long bars 47 of attachment portion 51 behind the plate 20. Once rotated a quarter turn, ninety degrees (90°), the anti-rotation lugs 45 are drawn forward into the long slots 24 to latch the position of the fastener. The contact of surfaces 46 with rear surface 21 of base plate 20 prevent its withdrawal. The engagement of anti rotation lugs 45 with the cruciform shape of receptacle 22 of base plate 20 prevents rotation of the fastener.

Referring to FIGS. 7 to 9, hanger bracket 26 of a curtain airbag assembly is attached to a base plate 20 of a vehicle using a rotatable quarter turn fastener 49 as follows. Using manual grips 63 of head portion 51 of fastener 49, attachment portion 50 of fastener 49 is inserted through fastener receiving hole 28 in hanger bracket 26. With attachment portion 50 positioned vertically and using grips 63 of head portion 51, attachment portion 50 is next inserted through receptacle 22 in base plate 20 placing attachment portion 50 behind the rear surface 21 of base plate 20. Insertion continues which deforms resilient arms 62, until anti-rotation lugs 45 surpass rear surface 21 of base plate 20. In this position, as illustrated in FIG. 7, arms 62 obscures the bar code indicia 34 on bracket 26.

Using grip portion 63 of head portion 51, and as illustrated in FIGS. 8 and 9, fastener 49 is then rotated clock-wise ninety degrees (90°) until anti-rotation lugs 45 align with long slots 24 of receptacle 22. Once anti-rotation lugs 45 are aligned with long slots 24, release of the fastener head portion 51 permits the restoring force of resilient legs 62 to pull the fastener 49 forward until the abutment surfaces 46 contact rear surface 21 of base plate 20. This abutting contact prevents withdrawal of the fastener 49 thereby releasably affixing the fastener 49 and hanger bracket 26 to base plate 20. The anti-rotation lugs 45 enter long slots 24 of receptacle 22, latching fastener 49 against rotation in its locked position. This position completes the attachment of hanger bracket 26 to base plate 20. At this juncture, abutment surfaces 46 of long bars 47 of attachment portion 50, are urged against the rear surface 21 of base plate 20. Anti-rotation lugs 45 are disposed in long slots 24 of receptacle 22. Arms 62 are stressed against the outer surface of hanger 26 and the fastener 49 is securely latched in its locked position with hanger bracket 26 attached to base plate 20.

As seen in FIG. 9, when fastener 49 is so positioned, arms 62 do not obscure bar code indicia 34 and an accurate scan of the bar code indicia 34 is assured for input to the computing device of the system. FIG. 8 illustrates that as the fastener is rotated to the locked position shown in FIG. 9, a portion of an arm 62 obscures the bar code indicia 34 preventing proper recognition and reading by the scanning equipment.

The particular shape of arms 62 is not limited to the form illustrated in FIGS. 1 to 9. The arms must, of course, be resilient to provide the force to maintain abutment surfaces 46 against the rear surface 21 of base plate 20. Also, it is important that arms 62 have sufficient breadth to obscure at least a portion of the bar code indicia 34 in any position other than the locked position of the fastener 49 as illustrated in FIG. 9.

FIGS. 10 through 14 illustrate various modifications of the fastener 49 of FIGS. 1 to 9 and the associated component or hanger bracket 26 and anchor or base plate 20. Here a fastener 149 is illustrated having an attachment portion 150, a head portion 151 and a connecting central shaft portion 152 with the features and functionality previously described with reference to the fastener 49 of FIGS. 1 to 9.

In this embodiment, fastener 149 includes radial arms 162 having sufficient breadth to mask the machine readable indicia or bar code 34 in all positions of the fastener relative to the component or hanger bracket 26 and base plate 20 except when in the locked position. That is, as best seen by the illustration of FIG. 9 when the fastener is in the locked position with the attachment portion 150 disposed at ninety degrees (90°) to the long slots 32 of hanger bracket 26 and long slots 24 of base plate 20, the arms of the fastener do not mask the bar code indicia 34. Thus, on scanning of an installation there is recognition of the presence of the bar code indicia which signifies complete insertion and locking of the associated fastener 49.

In the embodiment of the fastener 149 seen in FIGS. 10 to 12 and 15, arms 162 are the same length and curved shape as arms 62 of the fastener 49 of the embodiment of FIGS. 1 to 9. They are, however, of a width coextensive with the lateral extent of attachment portion 150 or head portion 151. Arms 162 are of sufficient radial length to provide the resilient forces already explained in connection with the arms 62 of the embodiment of FIGS. 1 to 9. Having the width illustrated, the arms 162 are also configured to mask at least a portion of a bar code indicia such as bar code 34 seen in FIGS. 7 to 9 in any position of rotation between insertion of attachment portion 150 through receptacle 22 of base plate 20 (See FIG. 7) and the locked position of the fastener (See FIG. 9).

FIGS. 10, 11 and 15 illustrate a further modification of the fastener of the present disclosure. As previously explained, it is often the case that final assembly of the component to the base plate occurs at a later stage of an assembly process, usually at a location remote from where the fasteners are manufactured, and associated with a hanger. Often different suppliers are involved, and the ultimate assembly occurs at an OEM assembly facility.

It is deemed desirable to the overall efficiency of manufacture and assembly to attach the fastener 149 to the hanger bracket prior to final installation. In this way, they may be shipped as a unitary sub-assembly for later use.

A similar situation obtains when several hanger brackets are already connected to a more comprehensive assembly such as a curtain airbag which is then installed at vehicle assembly. In such instance, it is advantageous to connect fasteners such as fastener 149 to each hanger bracket for later use to attach the curtain airbag to base plates contained on the vehicle.

As seen in FIGS. 10, 11 and 15, fastener 149 is arranged to releasably receive and retain a component such as a hanger bracket 126 shown in FIG. 13 as a pre-assembled unit for attachment to a base plate, or anchor, such as base plate 120 shown in FIG. 14. Also, as will become apparent, the hanger bracket 126 of FIG. 13 is modified to coact with a receptacle 122 of hanger bracket 126 to prevent rotation of the hanger bracket 126 relative to the base plate 120 on attachment using a fastener 149.

Referring to FIGS. 10, 11 and 15 as described above, fastener 149 is generally configured as is the fastener 49 of FIGS. 1 to 9. It includes the structural configurations and features previously described for its functional capabilities and interrelationship with a hanger bracket such as hanger bracket 126 and bar code indicia and a base plate such as base plate 120. It includes a head portion 151, a rear attachment portion 150, and a connecting cylindrical shaft portion 152.

The rear attachment portion 150 comprises an energy absorbing structure as previously described. It is of cruciform shape having two opposed long bars 147 and two opposed short bars 144 which define anti-rotation lugs 145 as described in connection with the embodiments of FIGS. 1 to 9.

As best seen in FIGS. 10, 11 and 15, each of the short bars 144 of the attachment portion 150 include an outward finger 170. Fingers 170 define seats 172 upon which a hanger bracket such as hanger bracket 126 of FIG. 13 may be releasably secured prior to insertion of attachment portion 150 through receptacle 122 of base plate 120. In this regard, the seats 172 of fingers 170 are disposed to frictionally engage the distal end surfaces or edges of the short slots 133 of fastener receiving hole 128 of hanger bracket 126. The fingers 170 are cantilevered to provide a resilient characteristic. The seats 172 are spaced apart slightly further than the distance between the distal ends of the short slots 133 and are slightly deformed on attachment of the hanger bracket 126 to the fastener 149.

As illustrated in FIG. 13, hanger bracket 126 includes a vertically elongated fastener receiving hole 128 having a generally circular opening 129 and opposed long slots 132 and opposed short slots 133. It is of general cruciform shape as in the hanger bracket 28 of the embodiment of FIGS. 1 to 9. It includes a machine readable medium in the form of bar code indicia positioned and functionally related to the fastener 149 as in the previous embodiment. As seen in FIG. 13, each of the long slots 132 and short slots 133 terminate at their ends distal to central cylindrical opening 129 in outward directed tangs 135 extending rearward of the plane of the hanger bracket 120.

The preassembled arrangement of fastener 149 and hanger bracket 126 is illustrated in FIG. 14. As illustrated, rear attachment portion 150 of fastener 149 has been inserted through fastener receiving hole 128 in hanger bracket 126. The fingers 170 are somewhat compressed toward the short bars 144 and capture the tangs 135 of short slots 133 upon seats 172.

The described relationship is maintained by virtue of the force applied to hanger bracket 126 by resilient arms 162. The arms 162 urge the hanger bracket toward the rear attachment portion 150 to maintain the engagement of tangs 135 with seats 172 of fingers 170.

On insertion of attachment portion 150 of fastener 149 through a receptacle 122 in a base plate 120, the hanger bracket 126 contacts the forward surface of base plate 120 and tangs 135 are dislodged from the fingers 170 and "snap" off the seats 172. Hanger bracket 126 then resides upon central cylindrical shaft portion 152. Attachment portion 150 is free to be inserted through receptacle 122 for completion of the affixation process. On such dislodgement the tangs 135 enter the cruciform shape of the receptacle 122 and engage within the long slots 124 and short slots 125 at the distal ends to fix the hanger bracket 126 relative to the base plate 120 against relative rotation.

Insertion of the rear attachment portion 150 continues by further deflection of arms 162 until the anti-rotation lugs 145 clear the rear surface 121 of the base plate 120. Using head portion 151, the fastener 149 is then rotated ninety degrees (90°) until the anti-rotation lugs 145 align with long slots 124 in receptacle 122. On release of head portion 151, the resilient legs 162 urge the rear abutment surfaces 146 against the rear surface 121 of base plate 120. The anti-rotation lugs 145 engage the long slots 124 of receptacle 122 and latch the fastener 149 in the locked position.

As stated above I the locked position of fastener 149, the tangs 135 are spaced apart a distance such that when the fastener 149 is fully affixed to base plate 120, the tangs 135 reside in the distal ends of the opposed long slots 124 and opposed short slots 125 of the fastener receptacle 122 of the associated base plate 120. This engagement between hanger bracket 126 and base plate 120 prevents rotation of the hanger bracket 126. As best seen in FIG. 14, the length of long slots 24 and short slots 125 of receptacle 122 of base plate 20 is somewhat increased as compared to the embodiment of FIGS. 1 to 9 to accommodate the presence of the tangs 135. Also the distal ends 127 of the slots 124 and 125 are "squared" off to receive the tangs 135.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. A quarter turn fastener to connect a component with a fastener receiving hole to a base plate having a fastener receptacle, said fastener comprising:
    a body rotatable between an insertion position connectable to the base plate and a locked position releasably securing the component to the base plate;
    an attachment portion configured to pass through the fastener receiving hole in the component and the fastener receptacle in the base plate;
    said attachment portion including at least one abutment surface to abut the back surface of the base plate in said locked position,
    a head portion to move said fastener between said insertion position and said locked position;
    wherein the component includes machine readable indicia and said fastener is configured to obscure at least a portion of the indicia except when in said locked position.

2. A quarter turn fastener as claimed in claim 1 wherein said head portion includes deformable resilient arms extending laterally outward and toward said attachment portion with ends to engage the front surface of the component and urge said at least one abutment surface toward the rear surface of the base plate, said arms configured such that at least one of said arms obscures at least a portion of the indicia on the component except when said fastener is in said locked position.

3. A quarter turn fastener as claimed in claim 2 wherein said resilient arms include ends spaced axially from said at least one abutment surface a distance less than the thickness of the component and the thickness of the base plate.

4. A quarter turn fastener as claimed in claim 3 wherein said attachment portion of said fastener comprises an energy absorbing configuration.

5. A quarter turn fastener as claimed in claim 1, wherein said fastener is further configured so it does not obscure said machine readable indicia when in said locked position.

6. A quarter turn fastener to connect a component with a fastener receiving hole to a base plate having a fastener receptacle, said fastener comprising:
    a body rotatable between an insertion position connectable to the base plate and a locked position releasably securing the component to the base plate;
    an attachment portion configured to pass through the fastener receiving hole in the component and the fastener receptacle in the base plate;
    said attachment portion including at least one abutment surface to abut the back surface of the base plate in said locked position,
    a head portion to move said fastener between said insertion position and said locked position;
    wherein the component includes machine readable indicia and said fastener is configured to obscure at least a portion of the indicia except when in said locked position
    wherein said attachment portion includes opposed long bars each defining an abutment surface for abutment with the rear surface of the base plate and at least one short bar defining at least one anti-rotation lug configured to latch in the receptacle of the base plate when said fastener is in the locked position.

7. A quarter turn fastener as claimed in claim 6 wherein said attachment portion is cruciform shape and includes two opposed short bars, each defining an anti-rotation lug configured to latch in the receptacle of the base plate when said fastener is in the locked position.

8. A quarter turn fastener as claimed in claim 7 wherein each said anti-rotation lug includes a radial outward finger, said fingers each defining a seat to receive and releasably retain the component to be affixed to the base plate.

9. A quarter turn fastener as claimed in claim 6 wherein said resilient arms have a width coextensive with the width of said head portion.

10. A quarter turn fastener and hanger bracket for connection to a base plate, said hanger bracket having a fastener receiving hole and said base plate having a fastener receptacle, comprising:
    a fastener body rotatable between an insertion position connectable to the base plate and a locked position releasably securing said hanger bracket to the base plate;

a head portion to move said fastener between said insertion position and said locked position an attachment portion sized to pass through said fastener receiving hole in said hanger bracket and the fastener receptacle in the base plate;

said attachment portion including at least one abutment surface to abut the back surface of the base plate in said locked position, and wherein said attachment portion includes two opposed short bars each including a radial outward finger, said fingers each defining a seat to receive and releasably support said hanger bracket wherein said fastener receiving hole in said hanger bracket includes opposed short slots including outwardly directed tangs extending toward said attachment portion and disposed on said seats of said fingers.

11. A quarter turn fastener and hanger bracket as claimed in claim 10 wherein said head portion includes deformable resilient arms extending laterally outward and toward said attachment portion with ends to engage the front face of said hanger bracket and releasably retain said hanger bracket on said seats of said opposed short bars.

12. A quarter turn fastener and hanger bracket as claimed in claim 11 wherein the hanger bracket includes machine readable indicia and said deformable arms are configured to obscure at least a portion of the indicia except when said attachment portion is in the locked position.

13. A quarter turn fastener and hanger bracket as claimed in claim 12 wherein said arms have a width coextensive with the width of said head position such that at least one of said arms obscures at least a portion of the indicia on the base plate except when said fastener is in said locked position.

14. A quarter turn fastener and hanger bracket as claimed in claim 10 wherein said attachment portion is cruciform shape and includes opposed long bars each defining an abutment surface for abutment with the rear surface of said base plate, and wherein said short bars define anti-rotation lugs, configured to latch in the receptacle of the base plate when said fastener is in its locked position.

15. A quarter turn fastener and hanger bracket as claimed in claim 14 wherein said fastener receiving hole in said hanger bracket is cruciform shape and includes opposed short slots and opposed long slots, each including outwardly directed tangs extending toward said attachment portion and said tangs of said short slots are disposed on said seats of said fingers.

16. A quarter turn fastener and hanger bracket as claimed in claim 15 wherein said head portion includes deformable resilient arms extending laterally outward and toward said attachment portion with ends to engage the front face of said hanger bracket and releasably retain said hanger bracket on said seats of said opposed short bars deformable resilient arms of said fastener urge said tangs into releasable engagement with said seats.

17. A quarter turn fastener and hanger bracket as claimed in claim 16 wherein the hanger bracket includes machine readable indicia and said deformable arms are configured to obscure at least a portion of the indicia except when said attachment portion is in the locked position.

18. A quarter turn fastener and hanger bracket as claimed in claim 17 wherein said arms have a width coextensive with the width of said head portion such that at least one of said arms obscures at least a portion of the indicia on the base plate except when said fastener is in said locked position.

19. An assembly of a quarter turn fastener and hanger bracket with a base plate having a fastener receiving receptacle, comprising:

a hanger bracket having a fastener receiving hole;

a fastener body connectable to said hanger bracket and rotatable between an insertion position connectable to the base plate and a locked position releasably securing said hanger bracket to the base plate;

a head portion to move said fastener between said insertion position and said locked position an attachment portion sized to pass through said fastener receiving hole in said hanger bracket and the fastener receptacle in the base plate;

said attachment portion including at least one abutment surface to abut the back surface of the base plate in said locked position, and wherein said attachment portion includes two opposed short bars each including a radial outward finger, said fingers each defining a seat to receive and releasably support said hanger bracket wherein said fastener receiving hole in said hanger bracket includes opposed short slots, each including outwardly directed tangs extending toward said attachment portion;

head portion includes deformable resilient arms extending laterally outward and toward said attachment portion with ends to engage the front face of said hanger bracket to urge said at least one abutment surface into abutting relation to the back surface of said base plate and said tangs into said fastener receiving receptacle of said base plate.

20. An assembly of a quarter turn fastener and hanger bracket with a base plate as claimed in claim 19 wherein the hanger bracket includes machine readable indicia and said deformable arms of said fastener are configured to obscure at least a portion of the indicia except when said attachment portion is in the locked position.

* * * * *